Patented May 9, 1933

1,908,654

UNITED STATES PATENT OFFICE

CARL L. BEAL, OF CUYAHOGA FALLS, OHIO, ASSIGNOR TO AMERICAN ANODE, INC., OF AKRON, OHIO, A CORPORATION OF DELAWARE

METHOD OF MANUFACTURING RUBBER ARTICLES

No Drawing.  Application filed January 15, 1929.  Serial No. 332,750.

This invention relates to the art of manufacturing rubber articles directly from rubber latex or from similar rubber emulsions, and has as its object to provide a method of removing excess uncoagulated latex from the surface of such freshly coagulated rubber articles.

Rubber coatings are most readily produced on forms or on shaped articles by immersing the forms or articles in a bath of latex or similar coagulable rubber emulsion containing the fillers, conditioning agents, etc. necessary to impart the desired properties to the rubber, and coagulating a substantially uniform layer of rubber on the surfaces of the forms or articles. The coagulation may be induced by the diffusion of coagulating ions, such as hydrogens ions or polyvalent metallic ions, from the surface to be coated; or by the passage of an electrical current, the surface to be coated being made the anode; or by any other known method or combination of methods. However, the coated forms or articles, as they are withdrawn from the latex bath, carry on their surface a film of uncoagulated liquid latex which tends to run over the surface and drip from the bottom of the coating. As the coating is dried this uncoagulated latex leaves permanent streaks on the surface and pendent dried rubber droplets on the bottom of the coating. Furthermore, when the article or form contain grooves, depressions or perforations, the uncoagulated latex because of its surface tension tends to accumulate in the grooves or depressions and form films across the perforations, and on drying partially or wholly fills or obstructs the grooves and perforations. If the uncoagulated latex is washed off the surface of the rubber coating with water, the reduction of the alkalinity of the latex consequent upon its dilution with the wash water promotes coagulation thereof, especially if tap water, containing soluble calcium salts or other coagulating salts, is employed. The result is that flocs or shreds of coagulated rubber are formed and adhere to the rubber coating, marring its appearance and diminishing its usefulness for many purposes.

This invention, in brief, consists in washing uncoagulated latex off of coagulated rubber coatings with a solution containing stabilizing and/or peptizing agents which inhibit the coagulation of the latex. The most important property of the said wash solution is its alkalinity, which should be sufficiently high to obviate all danger of coagulating latex with which it is mixed. The degree of alkalinity need not be great. An alkalinity corresponding to pH 8 or 9 is usually sufficient, pH 7 representing substantial neutrality. It will usually be preferred to employ more alkaline solutions, however, since the advantages secured by the practice of this invention then becomes more marked.

Such wash solutions may contain ammonia, sodium hydroxide, potassium hydroxide, sodium borate, trisodium phosphate or other soluble materials of alkaline reaction which are free from coagulating ions such as polyvalent metallic ions. Ammonia is preferred because it is completely volatile and does not require a second washing to remove the stabilizing material. For example, the uncoagulated latex may readily be washed off of coagulated rubber coatings by immersion in a solution of about 1 part by volume of concentrated ammonia in 100 parts of distilled water. Tap water may be substituted for the distilled water, but if it contains more than a very small concentration of bivalent ions the concentration of ammonia should be increased to overcome the coagulating action of such ions.

It is preferred, however, to employ in addition to an alkaline material as described above, a peptizing agent or emulsion colloid such as gelatine, casein, gum arabic, agar, soap, etc. These colloids are all soluble in slightly alkaline solutions, and all promote the emulsification or dispersion of liquids or finely divided solids. Hence they are frequently termed generically protective colloids, and will hereinafter be so termed. The addition of such colloids has been found to help materially in washing uncoagulated latex and even flocs and agglomerates off of the surface and out of depressions and perforations of coagulated rubber coatings. For example, a solution comprising about 0.2% of ammonium oleate containing sufficient ammonia to render the solution distinctly alkaline, or a solution comprising about 0.4% of casein and 0.3% of ammonia, has been found extremely effective.

In the process of coating perforated metal objects with holes ¼″ in diameter with a coating 1/16″ thick, the wet, freshly coagulated coating is about twice that thick, so that the free opening left by the coagulated rubber is very small. However, a dilute alkaline colloidal solution such as the above soap solution efficiently removes the uncoagulated latex, permitting the manufacture of articles with a smooth surface and clean, unobstructed perforations. The articles subsequently may be dried, and vulcanized by any of the known methods.

When pure water is not readily available, it will be found advantageous to soften the water by adding a softening agent such as sodium carbonate or trisodium phosphate, which will precipitate polyvalent metallic ions, before adding the soap or other colloid. However, soap will neutralize the effect of small amounts of polyvalent metallic ions (for example calcium, magnesium or iron ions), by forming insoluble soaps and removing such ions from the solution. The soap also acts as a lubricant, lessening the tendency of the freshly coagulated coatings to adhere if they accidentally come in contact with one another, and has no injurious action on the rubber.

The uncoagulated latex may be washed off of the rubber coating by immersion in solutions such as those described above, or by applying the solutions in a gentle spray, or in any other convenient manner. For example, the coated forms or articles may be immersed first in an alkaline solution containing a colloid, then in a simple solution of an alkaline material, and finally washed off in a water spray.

It is to be understood that the term latex as herein employed, is intended to include natural latices of caoutchouc, gutta-percha, balata, etc., as well as artificial latices or aqueous emulsions of caoutchouc, gutta-percha, balata, reclaimed rubber, synthetic rubber, rubber isomers and like products, whether or not admixed with vulcanizing agents, pigments, fillers, etc., or previously purified, concentrated, vulcanized or otherwise treated.

While I have herein disclosed with considerable particularity certain preferred manners of performing my invention, I do not thereby desire or intend to limit myself solely thereto, for, as hitherto stated, the precise proportions of the materials utilized may be varied and other materials having equivalent chemical properties may be employed, if desired, without departing from the spirit and scope of the invention as defined in the appended claims.

I claim:
1. The method of removing uncoagulated latex from coagulated rubber coatings, which comprises washing the rubber coatings with an alkaline solution of a protective colloid, substantially free from coagulating ions.
2. The method of removing uncoagulated latex from coagulated rubber coatings, which comprises washing the rubber coatings with an ammonical solution of a member of the class comprising gelatine, casein, gum arabic, agar, and soaps.
3. The method of removing uncoagulated latex from coagulated rubber coatings, which comprises washing the rubber coatings with an alkaline soap solution substantially free from coagulating ions.
4. The method of removing uncoagulated latex from coagulated rubber coatings, which comprises washing the rubber coatings with a solution of an ammonium soap.
5. The method of manufacturing rubber articles which comprises coagulating latex on a form, and washing the excess uncoagulated latex from the form with an alkaline solution of a protective colloid, said solution being substantially free from coagulating ions.
6. The method of manufacturing rubber articles which comprises coagulating latex on a form, washing the excess uncoagulated latex from the form with an alkaline solution of a protective colloid, said solution being substantially free from coagulating ions, and drying and vulcanizing the latex coating.

In witness whereof I have hereunto set my hand this 8th day of January 1929.

CARL L. BEAL.